(12) United States Patent
Dearing, Jr.

(10) Patent No.: US 7,137,459 B1
(45) Date of Patent: Nov. 21, 2006

(54) SILICATE DRILLING FLUID AND METHOD OF DRILLING A WELL THEREWITH

(75) Inventor: Harry L. Dearing, Jr., The Woodlands, TX (US)

(73) Assignee: Newpark Drilling Fluids, Houston, TX (US)

( * ) Notice: Subject to any disclaimer, the term of this patent is extended or adjusted under 35 U.S.C. 154(b) by 371 days.

(21) Appl. No.: 10/819,844

(22) Filed: Apr. 7, 2004

Related U.S. Application Data

(60) Provisional application No. 60/461,993, filed on Apr. 11, 2003.

(51) Int. Cl.
*E21B 21/00* (2006.01)
*E21B 47/00* (2006.01)

(52) U.S. Cl. .................. 175/40; 73/152.19; 73/152.43; 175/65; 175/72; 507/140; 507/141; 507/145

(58) Field of Classification Search .................. 175/40, 175/65, 72; 73/152.19, 152.23, 152.43; 507/140, 507/141, 145
See application file for complete search history.

(56) References Cited

U.S. PATENT DOCUMENTS

| | | | | |
|---|---|---|---|---|
| 2,133,759 A * | 10/1938 | Vail et al. | .................... | 507/145 |
| 2,146,693 A * | 2/1939 | Vietti et al. | .................. | 507/145 |
| 3,259,189 A * | 7/1966 | Darley | ........................ | 166/292 |
| 3,679,001 A * | 7/1972 | Hill | ............................. | 166/292 |
| 3,746,109 A * | 7/1973 | Darley | ........................ | 175/66 |
| 4,988,450 A * | 1/1991 | Wingrave et al. | ........... | 507/118 |
| 5,211,250 A * | 5/1993 | Kubena et al. | ................ | 175/72 |

* cited by examiner

*Primary Examiner*—George Suchfield
(74) *Attorney, Agent, or Firm*—Roy F. House

(57) ABSTRACT

The invention discloses methods of formulating an alkali metal silicate-containing drilling fluid and drilling a well therewith. Thus an alkali metal silicate is added to an aqueous base drilling fluid, when the drilling fluid is being circulated while drilling, at a rate sufficient to react with the drilled cuttings and freshly exposed surface of the borehole while leaving very little excess soluble silicate in the drilling fluid circulated to the surface. The rate of addition of the silicate is based on the circulation rate of the drilling fluid in the wellbore and the volume of the hole being drilled.

5 Claims, No Drawings

SILICATE DRILLING FLUID AND METHOD OF DRILLING A WELL THEREWITH

This application claims priority to Provisional application No. 60/461,993, filed on Apr. 11, 2003.

FIELD OF THE INVENTION

The invention relates to aqueous oil and gas well drilling and servicing fluids containing an alkali metal silicate borehole and cuttings stabilization additive.

BACKGROUND OF THE INVENTION

During well-drilling operations, formations are often encountered which lose physical and dimensional integrity when exposed to aqueous drilling fluids (muds). In most cases, such formations comprise reactive shales. Prior to the advent of oil-based, emulsion and invert emulsion muds, great difficulty was encountered in drilling these types of shales. On the other hand, while hydrocarbon-containing muds make drilling through reactive shales possible, they pose safety and environmental hazards and can interfere with well-logging operations.

A variety of water-based drilling additives has been developed over the years in an attempt to deal with shale drilling problems effectively while avoiding the problems encountered when oil-based muds were used.

Sawsdon, in U.K. Patent Application 2,089,397A, disclosed an aqueous wellbore fluid for use in drilling, well completion, packing, perforating or workover fluid containing at least 20% by weight of potassium carbonate; optionally a water-soluble polymeric viscosifier, such as carboxymethylcellulose, was added to the wellbore fluid. Gray et al., in "Composition and Properties of Oil Well Drilling Fluid", 4th Edition (Gulf Publishing Company 1980), reported the use of potassium salts in drilling fluids to suppress the swelling of bentonite, potassium chloride being preferred. Another standard industry reference that describe the shale stabilizing effect of the potassium ion in polymer muds may be found in SPE 10100 "Fundamentals and Use of Potassium/Polymer Drilling Fluids to Minimize Drilling and Completion Problems Associated with Hydratable Clays," by R. P. Steiger, presented at the 56th Annual Fall Technical Conference, Dallas, Tex., Oct. 5–7, 1981. U.S. Pat. No. 4,447,341, to Block relates to a drilling fluid containing A10(OH) and a crosslinked polyvinyl alcohol together with a potassium salt, such as potassium chloride, as a clay-stabilizing composition. Coffey et al., in the Oil & Gas Journal, Jan. 27, 1987, described shale inhibition using an aqueous system, maintained at a pH of 9.0 or less, which contains an unidentified nonionic polymer combined with potassium phosphate complex of undefined composition. Peterson in U.S. Pat. No. 4,780,220 discloses the use of glycerin, polyglycerin, and mixtures thereof in a drilling mud to inhibit the swelling of clays.

The technology of choice for aqueous-based shale-stabilizing muds involves the use of partially hydrolyzed polyacrylamide (PHPA) combined with potassium chloride. Scheuerman disclosed such a combination in U.S. Pat. No. 3,738,437 as part of a regimen for dealing with shale-drilling problems. Systems involving PHPA in combination with various electrolytes, including potassium chloride, at pH of 8.5 to 10.0, were also reviewed by Clark et al. in SPE/IADC 10681, presented at the Mar. 15–18, 1987 SPE/IADC Drilling Conference in New Orleans, La.

Cannon U.S. Pat. Nos. 2,109,858 and 2,191,312 generally disclose the addition of various polyhydroxy compounds, which includes certain carbohydrates such as sucrose, and an alkaline material, such as caustic soda, in aqueous drilling fluids for purposes of inhibiting shale swelling.

Salathiel U.S. Pat. No. 2,785,125 discloses a water base drilling fluid containing 1–15 ppb starch and 0.5–10 ppb of a water soluble heat degradation product of a saccharide containing 1 to 4 sugar units. The starch and degradation product combine to reduce the fluid loss of the drilling fluid. Salathiel U.S. Pat. No. 2,786,027 discloses a water base drilling fluid containing 1–15 ppb starch and 0.5–5 ppb of an additive having an average molecular weight of about 90 to 3000 and a ratio of carbon to oxygen of 1.5 to 2.7. The starch and additive combine to reduce the fluid loss of the drilling fluid. Walker U.S. Pat. No. 3,849,317 discloses a water base drilling fluid having a liquid phase saturated with calcium hydroxide containing as an additive for reducing gel strength and yield point, from ⅛ to 8 ppb of hydrolyzed cereal solids which is comprised of from about 15% to about 25% di-saccharides, tri-saccharides, tetrasaccharides, and pentasaccharides, and from 75% to 85% hexa-saccharides and above. Perricone et al. U.S. Pat. No. 4,941,981 discloses a drilling fluid for shale inhibition comprising a liquid phase containing: (a) a water phase comprising fresh water, sea water, brine, simulated brine, or mixtures thereof; and (b) a water-soluble component selected from the class consisting of polyhydric alcohols, glycol, glycol ethers, polypropylene glycols, polyethylene glycols, ethylene oxide-propylene oxide copolymers ("EO-PO"), alcohol-initiated EO-PO copolymers and/or mixtures thereof, the concentration of said water-soluble component in the total liquid phase being from about 5% to about 50% by volume.

Sheu et al. U.S. Pat. No. 5,110,484 discloses aqueous drilling fluids containing the browning reaction product of a carbohydrate, such as pentose, hexose such as fructose and glucose, as well as di- and poly saccharides, such as sucrose, lactose, mannose, cellulose, starch, dextrin, dextran, carboxymethylcellulose, rice and derivatives of such carbohydrates.

Drilling fluids containing alkali metal silicates have also been proposed for drilling shale-containing formations. Thus Vail et al., in U.S. Pat. No. 2,133,759, disclose muds containing alkali metal silicates. In U.S. Pat. No. 2,146,693, Vietti et al. disclosed a drilling fluid containing one of several sodium salts, including sodium silicate, the sodium salt content of the mud being in excess of 20% by weight. The following U.S. patents also disclose sodium silicate-containing drilling fluids: Vietti et al. U.S. Pat. No. 2,165, 824; Garrison U.S. Pat. No. 2,239,647; and Garrison et al. U.S. Pat. No. 2,353,230.

Wingrave et al. U.S. Pat. No. 4,98,450 discloses drilling fluids containing a shale stabilizing additive comprising one or more water-soluble polymers which are capable of forming nucleophilic sites when treated with a base, such as partially hydrolyzed polyvinyl acetate, and one or more alkaline potassium salts in a weight ratio generally in the range between 1:20 to about 3:1, preferably from about 1:2 to about 1.5:1. Usually the additive is added to the drilling fluid at a level between 0.01 weight percent and 10.0 weight percent of the aqueous phase, typically between about 0.1 and about 4.0 weight percent, and preferably between about 0.3 and about 2.0 weight percent. The potassium salts are relatively strong Bronated-Lowry bases, such as potassium silicate, potassium carbonate, and tribasic potassium phosphate.

Mullen et al. U.S. Pat. No. 6,248,698 discloses silicate drilling fluids containing hematite weighing agents and manganese oxide bridging agents.

Although drilling fluids containing sodium and potassium silicates have been used for decades to combat shale problems, these fluids have had limited success for the following reasons: free soluble silicate in the drilling fluid reacts with accumulated drilled solids to create problems in control of the drilling fluid properties; free soluble silicate in the drilling fluid filtrate polymerizes or precipitates after invading a potentially productive formation to cause severe reduction in permeability; free soluble silicate in the drilling fluid precludes the use of lubricants commonly used for torque reduction.

SUMMARY OF THE INVENTION

The invention provides novel methods of formulating an alkali metal silicate-containing drilling fluid and drilling a well therewith which avoids these problems. Thus an alkali metal silicate is continuously added to an aqueous base drilling fluid, when the drilling fluid is being circulated while drilling, at a rate sufficient to react with the drilled cuttings and freshly exposed surface of the borehole while leaving very little excess soluble silicate in the drilling fluid circulated to the surface. The rate of addition of the silicate is based on the circulation rate of the drilling fluid in the wellbore and the volume of hole being drilled.

Thus the invention provides (1) a well drilling process in which a drilling fluid is continuously circulated at the rate of R gallons per minute in the borehole while drilling which comprises continuously adding to the circulating drilling fluid an alkali metal silicate solution in an amount from about $(0.0005)(R)$ gallons per minute to about $(0.02)(R)$ gallons per minute, adjusting the addition of the silicate solution until the concentration of soluble silica in the drilling fluid filtrate at the well flowline is from about 0.1 to about 0.25% by weight, and thereafter continuing the addition of the silicate solution as needed to maintain this concentration of soluble silica in the drilling fluid filtrate at the well flowline, and (2) a well drilling process in which a drilling fluid of density D pounds per gallon is continuously circulated at the rate of M gallons per minute in the borehole while drilling which comprises continuously adding to the circulating drilling fluid a solid alkali metal silicate in an amount not less than about $(0.001)(M)(D)$ pounds per minute, adjusting the addition of the silicate solution until the concentration of soluble silica in the drilling fluid filtrate at the well flowline is from about 0.1 to about 0.25% by weight of the drilling fluid filtrate at the well flowline, and thereafter continuing the addition of the solid silicate as needed to maintain this concentration of soluble silica in the aqueous phase of the drilling fluid.

Preferably the alkali metal silicate solution is continuously added in an amount from about $(0.001)(R)$ gallons per minute to about $(0.01)(R)$ gallons per minute, most preferably from about $(0.001)(R)$ to about $(0.005)(R)$.

The preferred alkali metal silicate is potassium silicate.

While the invention is susceptible to various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

DESCRIPTION OF THE PREFERRED EMBODIMENTS

The aqueous base drilling fluid of this invention contain from about 0.1 to about 0.25 weight percent of the aqueous phase of soluble silica when measured in the filtrate at the flowline in the circulating drilling fluid. The drilling fluids are prepared by continuously adding while drilling an alkali metal silicate (hereinafter sometimes referred to as "AMS") to an aqueous base drilling fluid which is being circulated at the known rate of R gallons per minute in a borehole. The rate of addition of the AMS in the form of an aqueous solution is an amount from about $(0.0005)(R)$ gallons per minute to about $(0.02)(R)$ gallons per minute and is added until the concentration of soluble silica in the drilling fluid filtrate at the well flowline is from about 0.1 to about 0.25% by weight. Thereafter the addition of the AMS solution is continued as needed to maintain this concentration of soluble silica in the liquid phase of the drilling fluid. Preferably the rate of addition of the AMS solution is from about $(0.001)(R)$ to about $(0.01)(R)$ gallons per minute, most preferably from about $(0.001)(R)$ to about $(0.005)(R)$ gallons per minute. The rate of addition of the AMS in the form of a solid is an amount not less than about $(0.001)(M)(D)$ pounds per minute where D is the density of the fluid in pounds per gallon and M is the circulation rate of the aqueous drilling fluid in gallons per minute, preferably from about $(0.001)(M)(D)$ to about $(0.0025)(M)(D)$ pounds per minute.

The rate of addition of the AMS should provide the drilling fluid with sufficient AMS to stabilize the cuttings until they are removed at the surface of the well and to seal the surface of the wellbore without maintaining greater than about 0.25% by weight excess soluble silica in the aqueous phase of the drilling fluid. Thus the rate of addition will also depend on the size of the borehole being drilled and the drilling rate.

The concentration of soluble silica in the aqueous phase of the drilling fluid is determined by measuring the concentration of silica in the filtrate obtained from the drilling fluid at the flowline of the well. The filtrate can be obtained by any filtration procedure which separates the liquid and solid phases of the drilling fluid, such as the filtration procedures set forth in API Recommended Practice RP 13B.

A suitable titration method for measuring the concentration of silica in the filtrate is to determine the alkali concentration by titrating the filtrate with 0.2 normal HCl followed by titrating another sample of the filtrate with 2.0 normal HCl as follows:

Field Test Method for Alkali Content in an Alkali Metal Silicate Drilling Fluid

1. Principle:

A sample of potassium silicate drilling fluid filtrate is weighed into a flask and mixed with water and a small amount of indicator (methyl orange). The mixed solution is then titrated with 0.2N HCl acid. All materials that react with acid are titrated and are calculated as a percent potassium oxide ($K_{2O}$).

2. Equipment and Chemicals:
 1. Hydrochloric Acid (HCl)-0.2 Normal
 2. Prepared Methyl Orange Indicator* (actually green in color)
 3. Beaker-400 ml
 4. Calibrated Burette/Pipette —25 ml
 5. Graduated Cylinder —100 ml
 *Methyl orange xylene can be purchased at most major suppliers of laboratory chemicals (i.e., Fisher Scientific)

3. Safety:
 Follow safe laboratory procedures such as wearing eye protection and gloves while handling chemicals.

4. Procedure:
 a. Measure 5 ml (to the nearest 0.1 ml) of an alkali metal silicate drilling fluid filtrate into a beaker.
 b. Add 100 ml of distilled water and swirl beaker until completely mixed.
 c. Add 4 drops of prepared methyl orange indicator and swirl beaker, solution will turn green.
 d. Titrate sample with 0.2 Normal HCl acid till a grey/light purple color develops
 e. Record volume of HCl acid used.

5. Calculation:

| For Potassium Silicate | For Sodium Silicate |
|---|---|
| $\dfrac{V \times 0.94}{W} = \% K_2O$ | $\dfrac{V \times 0.62}{W} = \% Na_2O$ |

V=volume in ml of HCl used during titration
W=weight in grams of silicate drilling fluid sample 6. Precision and Accuracy:
 Samples should be done in duplicate. Accuracy of this procedure can be effected by other mud ingredients (ex. caustic, sodium silicate, sodium carbonate etc.) acid/or possible contamination from the drill hole.

Field Test Method for Silica Content in an Alkali Metal Silicate Drilling Fluid

1. Principle:
 A sample of silicate drilling fluid filtrate is weighed into a flask and mixed with water and a small amount of indicator (methyl red). The mixed solution is then titrated with 2.0N HCl acid until the solution turns and stays reddish-orange.

2. Equipment and Chemicals:
 1. Hydrochloric Acid (HCl)-2.0 Normal
 2. Sodium Fluoride
 3. Prepared Methyl Red* (actually orange in color)
 4. Beaker —400 ml
 5. Calibrated Burette/Pipette —25 ml
 6. Graduated Cylinder—100 ml
 *1 gram methyl red indicator dissolved in 600 ml methanol. Add 400 ml distilled water to bring final volume to 1 liter.

3. Safety:
 Follow safe laboratory procedures such as wearing eye protection and gloves when handling chemicals. It is recommended that a dust mask be worn when handling NaF powder.

4. Procedure:
 a. Measure 5 ml (to the nearest 0.1 ml) of an alkali metal silicate drilling fluid filtrate into a beaker.
 b. Add 100 ml of distilled water and swirl beaker until completely mixed.
 c. Add 4 drops of prepared methyl red indicator and swirl beaker, solution will turn yellow.
 d. Titrate sample with 2.0 Normal HCl acid to a red color, while stirring constantly.
 e. Add 4g of previously weighed sodium fluoride and mix thoroughly. The color will turn back to yellow.
 f. Continue titration after the addition of sodium fluoride. Titrate until the yellow color disappears and a reddish-orange color develops and stays.

5. Calculation:

| For Potassium Silicate | For Sodium Silicate |
|---|---|
| $\dfrac{\% K_2O \times W}{9.42} = $ alkali correction (AC) | $\dfrac{\% Na_2O \times W}{6.2} = $ alkali correction (AC) |
| $\dfrac{(V-AC) \times 3.0}{W} = \% SiO_2$ | $\dfrac{(V-AC) \times 3.0}{W} = \% SiO_2$ |

% $K_2O$, % $Na_2O$=previously calculated from alkali titration
V=volume in ml of HCl used during titration
W=weight in grams of silicate drilling fluid filtrate sample 6. Precision and Accuracy:
 Samples should be done in duplicate. Accuracy of this procedure can be effected by other mud ingredients and/or possible contamination from the drill hole.
 Potassium silicates and sodium silicates are commercially available from several sources. AMS available from the PQ Corporation are set forth in Table A and Table B.

TABLE A

Potassium Silicates

| PQ Corporation Product name | $SiO_2$/$K_2O$ | % $SiO_2$ | % $K_2O$ | % Solids | Density (20° C.) ppg | lb/ft³ |
|---|---|---|---|---|---|---|
| KASIL ® 1 | 2.5 | 20.8 | 8.3 | 29.1 | 10.5 | — |
| KASIL ® 6 | 2.1 | 26.5 | 12.65 | 39.15 | 11.5 | — |
| KASIL ® 33 | 2.1 | 24.4 | 11.6 | 36.0 | 11.2 | — |
| KASOLV ® 16 | 1.6 | 52.8 | 32.5 | 85.3 | — | 43.0 |
| KASIL ® 1624 | 1.65 | 15.0 | 9.1 | 24.1 | 10.16 | — |
| KASIL ® 2130 | 2.1 | 20.0 | 9.5 | 29.5 | 10.6 | — |
| KASIL ® 2135 | 2.18 | 24.0 | 11.0 | 35.0 | 11.15 | — |
| KASIL ® 2.5 Flake | 2.5 | 71.0 | 28.4 | 99.4 | — | 77.5 |
| KASIL ® SS Powder | 2.5 | 71.0 | 28.4 | 99.4 | — | 57.4 |
| AGSIL ™ 25H | 2.5 | 60.65 | 24.25 | 84.9 | — | — |

TABLE B

Sodium Silicates

Typical Composition

| PQ Corporation Product Name | $SiO_2$/$Na_2O$ | % $SiO_2$ | % $Na_2O$ | % Solids | Density (20° C.) ppg | g/cm³ |
|---|---|---|---|---|---|---|
| A ® 1647 | 1.6 | 28.8 | 18.0 | 46.8 | 13.40 | 1.60 |
| A ® 1847 | 1.8 | 30.20 | 16.78 | 47.0 | 13.24 | 1.59 |
| A ® 2445 | 2.4 | 32.2 | 13.4 | 45.6 | 12.8 | 1.54 |
| A ® 2447 | 2.40 | 33.2 | 13.9 | 47.1 | 13.0 | 1.56 |
| A ® 2645 | 2.58 | 32.1 | 12.5 | 44.6 | 12.63 | 1.51 |
| BJ ™ 120 | 1.80 | 23.7 | 13.15 | 36.85 | 11.9 | 1.43 |
| BW ™ 50 | 1.60 | 26.2 | 16.75 | 42.55 | 12.7 | 1.53 |

TABLE B-continued

Sodium Silicates

Typical Composition

| PQ Corporation Product Name | SiO₂/Na₂O | % SiO₂ | % Na₂O | % Solids | Density (20° C.) ppg | g/cm³ |
|---|---|---|---|---|---|---|
| C ™ 50 | 2.0 | 36.00 | 18.00 | 54.0 | 14.1 | 1.69 |
| D ™ | 2.00 | 29.4 | 14.7 | 44.1 | 12.8 | 1.53 |
| E ™ | 3.22 | 27.7 | 8.6 | 36.3 | 11.5 | 1.37 |
| K ® | 2.88 | 31.7 | 11.0 | 42.7 | 12.3 | 1.47 |
| M ® | 2.58 | 32.1 | 12.4 | 44.5 | 12.6 | 1.50 |
| N ® | 3.22 | 28.7 | 8.9 | 37.6 | 11.6 | 1.38 |
| N ® 38 | 3.22 | 28.7 | 8.9 | 34.6 | 11.3 | 1.36 |
| N ® Clear | 3.22 | 28.7 | 8.9 | 37.6 | 11.6 | 1.38 |
| O ® | 3.22 | 29.5 | 9.1 | 38.6 | 11.8 | 1.41 |
| OW ® | 3.22 | 29.46 | 9.15 | 38.61 | — | — |
| RU ™ | 2.40 | 33.0 | 13.9 | 47.1 | 13.0 | 1.56 |
| SS ® | 3.22 | 75.7 | 23.5 | 99.2 | (11.8) | 1.41 |
| SS ® 22 | 3.22 | 75.7 | 23.5 | 99.2 | — | 1.44 |
| SS ® 75 | 2.75 | 72.9 | 26.5 | 99.4 | (11.8) | 1.41 |
| Star ™ | 2.50 | 26.5 | 10.6 | 37.1 | 11.7 | 1.40 |
| Starso ® | 1.80 | 24.12 | 13.40 | 37.52 | 12.0 | 1.44 |
| Stixso ™ RR | 3.25 | 30.0 | 9.2 | 39.2 | 11.8 | 1.41 |
| V ™ | 2.50 | 26.5 | 10.6 | 37.1 | 11.7 | 1.40 |

In order to more completely describe the invention, the following example is given.

EXAMPLE OF THE INVENTION

Background

The White River Dome field is a gas field in the Piccance basin of western Colorado that is operated by Tom Brown, Inc. This field consists of 67 active producing wells. The main producing horizon is the Cameo sandstones and coals found at a depth of 5,500 to 6,500 ft'. Since the field is on land that is under Bureau of Land Management (BLM) jurisdiction, a number of restrictions apply to the drilling operations. One important restriction is that year-round drilling is not permitted. The drilling season for the field usually starts in the spring and goes through the end of the year. This break in the workflow gives time to evaluate the results of the previous year and plan on improvements for the upcoming drilling season.

In the case of the White River Dome field, a number of opportunities for improving drilling performance were identified during the 2001 drilling season:

Two stage cementing increased cementing costs, rig costs and completion costs of a well by $50,000 to $75,000

Hole washout in the upper hole section below surface casing required large cement volumes and increased the likelihood of lost circulation during cementing Due to the extensive fracture treatments anticipated for the wells, primary cementing success (as measured by cement bond logs) was a requirement for drilling success PDC (polycrystalline diamond compact) bits performed very effectively, averaging rates of penetration of over 100 ft/hr in most wells—increasing the footage drilled by PDC bits would result in fewer bits, higher rates of penetration, and lower drilling costs.

Wellbore design during the drilling programs at White River Dome Field over the past three years involved:

Drilling 11" hole to 1,100' (Gel/Lime Spud mud)

Running 8-⅝" Surface Casing (cement to surface)

Drilling 7-⅞" hole to TD (water and LSND mud)

Running 5-½" Casing (cement to surface).

Top of cement behind the 5-½" production casing must be above the surface casing shoe to cover shallow water and gas flows in the Wasatch formation. Lost circulation and hole washouts cause problems toward achieving an acceptable top of cement. Sloughing shales in the Wasatch formation cause hole washouts, and consequently, large cement volumes. Lost circulation problems exist during cementing due to breakdown of deeper sand and coal seams through the Cameo formation. Due to the problems with lost circulation during cementing, lightweight cement with a compressive strength above 2,000 psi was used to achieving a top of cement above the surface casing shoe. With the higher cost slurry, a reduction in the cementing volume was necessary to reduce well cost.

The Wasatch formation is drilled with water and a PDC bit, which is typically pulled for bit balling problems after drilling through a bentonite stringer in the Mesa Verde/Williams Fork formation. Mud-up with a lignosulfonate non-dispersed (LSND) mud occurs prior to pulling the PDC and the well is then drilled to TD (6,200' to 7,200') in the Rollins formation with as many as three tricone bits.

To improve bit life, increase rate of penetration, and reduce the hole washouts, several changes were made over the past two years to the mud program, bit selection and drilling hydraulics during drilling operations in the White River Dome Field. In an effort to reduce hole washouts during 2001 drilling program, the circulating rate during drilling of the 7-⅞" hole was reduced by 28% from 460 gpm (gallons per minute) down to 330 gpm, which reduced the annular velocity from 270 ft/min down to 193 ft/min. Hole washout were slightly reduced (by +/-½") due to reduced circulating rate without any loss of rate of penetration (ROP) despite a drop in the hydraulic horsepower per square inch (HSI) at the bit. During 2003, jet sizes will be reduced during drilling with the PDC and tricone bits to increase the HSI to between 2.5 to 5 in an attempt to improve ROP and reduce bit-balling problems.

During the 2002 drilling program, several changes were made concerning bit selection and mud design. The typical PDC design used during 2000 and 2001 was a 6 blade ¾" cutter bit, where as during 2002, a switch was made to a 5 blade ⅝" cutter design in an attempt to improve on the PDC durability for a longer run time. In addition to the PDC change, a ROP additive (a polyglycerol ester) was also added to the mud system to reduce problems with bit balling while drilling bentonite stringers. The combination of the change in PDC design and the ROP additive resulted in longer PDC bit runs with elimination of just over 1 tricone bit run per well. The elimination of one bit trip and the enhanced ROP resulted in reducing average days on location by one day between the 2001 and 2002 drilling programs.

During the 2000 and 2001 drilling programs, a potassium chloride (KCl) substitute was added to improve the shale stability while drilling through the Wasatch formation. While the KC 1 substitute did help reduce the washouts in the shale sections, average hole size through the Wasatch formation was still over 10", which meant that the KCL substitute did not effectively reduce cementing costs. A different approach to stabilize the shales involving potassium silicate during the water section of drilling was implemented during the 2002 drilling program. The addition of potassium silicate successfully reduced hole size, resulting in a 28% average reduction in cement volume when compared to the previous years.

Drilling Fluid Design

Analysis of the well calipers obtained from the wells drilled during 2001 showed that most of the hole enlargement occurred in the portion of the hole below surface casing to about 4,000 ft TVD (true vertical depth). This was also the portion of the hole that was drilled with water while circulating the reserve pit. This resulted in high rates of penetration with a PDC bit and low cost per foot.

Experience in the area suggested that the hole washout could be reduced by "mudding up" in this interval with a partially hydrolyzed polyacrylamide (PHPA) mud. Experience had also shown that this would result in increased mud costs and lower rates of penetration. For these reasons, an alternate strategy was required.

The continuous injection of potassium silicate solution at 0.1% of the drilling fluid pumping rate into the mud pump suction was proposed. This would result in a low cost treatment of the wellbore as drilling progressed and not compromise drilling rate. Prior to "mudding up" at 4,000 ft, the addition of silicate would be discontinued and the silicate allowed to deplete from the fluid.

The silicate selected for this application has the following properties:

| | |
|---|---|
| Density | 10.5 lb/gal |
| $K_2O$ | 8.3 wt % |
| $SiO_2$ | 20.75 wt % |
| Ratio, % $SiO_2$/% $K_2O$ | 2.5 |
| Viscosity | 40 cPs |
| Solids | 29.05 wt % |

The reaction between the exposed wellbore and the potassium silicate occurs because the lower pH of the wellbore surface and the presence of divalent cations, calcium and magnesium, cause precipitation of a hydrous silicate gel. These gels act to seal the surface of the wellbore, increasing its stability. Potassium silicate was chosen over sodium silicate for two reasons. Potassium silicate is soluble at a lower pH than sodium silicate. Also, the potassium ion has proven to inhibit clay swelling. The presence of quartz (crystalline $SiO_2$) in the sands and shales on the exposed wellbore provides preferential sites for the bonding of the silicate.

In addition to the potassium silicate, control of pH with caustic potash (KOH) at 10.5 was recommended. It was also anticipated that high viscosity sweeps would be pumped as needed to facilitate hole cleaning.

The fluid design was developed to address the problem of wellbore enlargement without affecting rate of penetration and minimally increasing mud cost. After discussion and review, the use of the silicate was approved for the 2002 drilling season.

Drilling Fluid Results

The first well drilled using the silicate additive to supplement the water was the Ant Hill Unit 25–22. After drilling and setting surface casing, a Smith M75VPX bit was used to drill out. As soon as cement had been drilled, the silicate solution was added to the water in the suction pit at a rate of 0.5 gal/min (0.15% of the circulation rate).

As drilling proceeded, the concentration of silicate solution in the water at the pump suction and flowline was monitored with the pH and potassium level.

There was significant depletion of the silicate solution in the well. The average silicate concentration for the suction pit was 0.14 wt % for the interval. The average flow line concentration was 0.10 wt %. This indicates that the reaction of the silicate with the wellbore and cuttings was proceeding rapidly, even at the low concentrations utilized. Also, there was rapid depletion of the silicate when additions were discontinued at about 3,200 ft.

A caliper log was run to determine the diameter of the borehole. In comparison with a typical caliper log from the 2001 drilling program indicates a significant reduction in hole enlargement from under surface casing to about 4000 feet—the interval drilled with this silicate-containing fluid.

What is claimed is:

1. A well drilling process in which a drilling fluid of density D pounds per gallon is continuously circulated at the rate of M gallons per minute in the borehole while drilling which comprises adding to the circulating drilling fluid a solid alkali metal silicate in an amount not less than about (0.01)(M)(D) pounds per minute, adjusting the addition of the solid silicate when the concentration of soluble silica in the drilling fluid filtrate at the well flowline is from about 0.1 to about 0.25% by weight, and thereafter continuing the addition of the solid silicate as needed to maintain this concentration of soluble silica in the drilling fluid filtrate.

2. The process of claim 1 wherein the alkali metal is potassium.

3. The process of claim 2 wherein the potassium silicate has a silica to potassium oxide weight ratio from about 0.5 to 1 to about 3 to 1.

4. The process of claim 1 wherein the alkali metal is sodium.

5. The process of claim 4 wherein the sodium silicate has a silica to sodium oxide weight ratio from about 1 to 1 to about 4 to 1.

* * * * *